(12) United States Patent
Edge

(10) Patent No.: US 6,606,554 B2
(45) Date of Patent: Aug. 12, 2003

(54) METHOD AND APPARATUS FOR DEFINING LOCATION COORDINATES

(75) Inventor: Stephen William Edge, Escondido, CA (US)

(73) Assignee: Siemens Information & Communication Mobile LLC, San Diego, CA (US)

(*) Notice: Subject to any disclaimer, the term of this patent is extended or adjusted under 35 U.S.C. 154(b) by 0 days.

(21) Appl. No.: 09/966,376

(22) Filed: Sep. 27, 2001

(65) Prior Publication Data

US 2003/0060970 A1 Mar. 27, 2003

(51) Int. Cl.[7] .............................................. G06F 165/00
(52) U.S. Cl. .................. 701/200; 342/357.08; 342/457; 340/995; 340/988; 382/232
(58) Field of Search ................................ 701/200, 210, 701/211, 208, 213; 342/357.08, 457; 340/988, 990, 995, 905; 382/232

(56) References Cited

U.S. PATENT DOCUMENTS

| | | | |
|---|---|---|---|
| 3,639,989 A | | 2/1972 | Rapsilber et al. |
| 5,428,725 A | | 6/1995 | Sugai et al. |
| 5,614,913 A | | 3/1997 | Nichols et al. |
| 5,774,826 A | | 6/1998 | McBride |
| 6,047,236 A | * | 4/2000 | Hancock et al. ............ 701/208 |
| 6,097,316 A | * | 8/2000 | Liaw et al. ................. 340/988 |
| 6,122,592 A | * | 9/2000 | Arakawa et al. ........... 701/201 |
| 6,125,304 A | | 9/2000 | Suzuki |
| 6,421,659 B1 | * | 7/2002 | Nomura ......................... 707/3 |
| 2001/0043745 A1 | * | 11/2001 | Friederich et al. .......... 382/232 |

* cited by examiner

Primary Examiner—Thomas G. Black
Assistant Examiner—Tuan C To

(57) ABSTRACT

A method and system allows two or more different coordinates for a geographic location to be expressed as a single string of characters. The single string of characters may include numerical digits or numbers, alphabetic characters or letters, punctuation or other typographical marks, other symbols, or a combination of two or more of these. A geographic location may refer to a physical place, the location of an object, or some other location.

25 Claims, 4 Drawing Sheets

METHOD AND APPARATUS FOR DEFINING LOCATION COORDINATES

BACKGROUND OF THE INVENTION

The present invention relates to a method and apparatus for defining location coordinates using a string of characters and, more particularly, embodiments of the present invention relate to methods, means, apparatus, and computer program code for expressing geographic location coordinates to a desired level of accuracy using a single string of characters.

Many geographic location or positioning formats exist for expressing the location of an entity (e.g., building, person, street intersection). For example, Universal Transverse Mercator (UTM), Universal Polar Stereographic (UPS), and the World Geodetic System of 1984 (WGS84) latitude and longitude format each provide techniques for defining or expressing the location of an entity. Unfortunately, such location positioning formats often require a cumbersome string of digits, letters, symbols, etc. For example, to express a location to within ten feet of accuracy using latitude and longitude, a string such as "18 degrees, 35 minutes, 17.8 seconds north; 75 degrees, 6 minutes, 57.3 seconds west" is required. As another example, in UTM, the same position would be expressed as "zone 18, 2055302 north, 487770 east". Such formulations increase the complexity of storage, recall and transfer of location information and are likely to lead to errors.

It would be advantageous to provide a method and apparatus that overcame the drawbacks of the prior art. In particular, it would be desirable to provide a method for expressing geographic location or position in either two or three dimensions using a single string of characters and with any desired level of accuracy.

SUMMARY OF THE INVENTION

According to embodiments of the present invention, a method for expressing a geographic location may include determining a plurality of coordinates associated with a geographic location; converting the plurality of coordinates into a respective plurality of strings of at least one character; and forming a single string of characters based on the plurality of strings of at least one character. In another embodiment, a method for expressing a geographic location may include determining a geographic location expressed using at least a first coordinate and a second coordinate; determining at least one attribute of the first coordinate; determining at least one attribute of the second coordinate; determining an attribute string based, at least in part, on the at least one attribute of the first coordinate and the at least one attribute of the second coordinate; creating a first string of at least one character representative of the first coordinate; creating a second string of at least one character representative of the second coordinate; and creating a single string of at least one character based, at least in part, on the first string, the second string, and the attribute string. In a further embodiment, a method for determining a geographic location may include determining a string of characters indicative of a geographic location; determining a plurality of strings from the string of characters, each of the plurality of strings being indicative of a coordinate associated with the geographic location; and converting each of the plurality of strings into data indicative of its respective coordinate in a universal coordinate system.

According to embodiments of the present invention, a system for creating a string expressing a geographic location, may include a memory; a communication port; and a processor connected to the memory and the communication port, the processor being operative to determine a plurality of coordinates associated with a geographic location; convert the plurality of coordinates into a respective plurality of strings of at least one character; and form a single string of characters based on the plurality of strings of at least one character. In another embodiment, a system for creating a string expressing a geographic location may include a memory; a communication port; and a processor connected to the memory and the communication port, the processor being operative to determine a geographic location expressed using at least a first coordinate and a second coordinate; determine at least one attribute of the first coordinate; determine at least one attribute of the second coordinate; determine an attribute string based, at least in part, on the at least one attribute of the first coordinate and the at least one attribute of the second coordinate; create a first string of at least one character representative of the first coordinate; create a second string of at least one character representative of the second coordinate; and create a single string of at least one character based, at least in part, on the first string, the second string, and the attribute string. In a further embodiment, a system for creating a string expressing a geographic location may include a memory; a communication port; and a processor connected to the memory and the communication port, the processor being operative to determine a string of characters indicative of a geographic location; determine a plurality of strings from the string of characters, each of the plurality of strings being indicative of a coordinate associated with the geographic location; and convert each of the plurality of strings into data indicative of its respective coordinate in a universal coordinate system.

According to embodiments of the present invention, a computer program product in a computer readable medium for creating a string expressing a geographic location may include first instructions for identifying a plurality of coordinates associated with a geographic location; second instructions for generating a plurality of strings of at least one character for the plurality of coordinates; and third instructions for generating a single string of characters based on the plurality of strings of at least one character. In another embodiment, a computer program product in a computer readable medium for creating a string expressing a geographic location may include first instructions for identifying a geographic location expressed using at least a first coordinate and a second coordinate; second instructions for identifying at least one attribute of the first coordinate; third instructions for identifying at least one attribute of the second coordinate; fourth instructions for identifying an attribute string based, at least in part, on the at least one attribute of the first coordinate and the at least one attribute of the second coordinate; fifth instructions for generating a first string of at least one character representative of the first coordinate; sixth instructions for generating a second string of at least one character representative of the second coordinate; and seventh instructions for generating a single string of at least one character based, at least in part, on the first string, the second string, and the attribute string. In a further embodiment, a computer program product in a computer readable medium for determining a geographic location may include first instructions for identifying a string of characters indicative of a geographic location; second instructions for identifying a plurality of strings from the string of characters, each of the plurality of strings being indicative of a coordinate associated with the geographic location; and third instructions for associating each of the plurality of strings into data indicative of a respective coordinate in a universal coordinate system.

According to embodiments of the present invention, an apparatus for creating a string expressing a geographic location may include means for identifying a plurality of coordinates associated with a geographic location; means for generating a plurality of strings of at least one character for the plurality of coordinates; and means for generating a single string of characters based on the plurality of strings of at least one character. In another embodiment, an apparatus for creating a string expressing a geographic location may include means for identifying a geographic location expressed using at least a first coordinate and a second coordinate; means for identifying at least one attribute of the first coordinate; means for identifying at least one attribute of the second coordinate; means for identifying an attribute string based, at least in part, on the at least one attribute of the first coordinate and the at least one attribute of the second coordinate; means for generating a first string of at least one character representative of the first coordinate; means for generating a second string of at least one character representative of the second coordinate; and means for generating a single string of at least one character based, at least in part, on the first string, the second string, and the attribute string. In a further embodiment, an apparatus for determining a geographic location may include means for identifying a string of characters indicative of a geographic location; means for identifying a plurality of strings from the string of characters, each of the plurality of strings being indicative of a coordinate associated with the geographic location; and means for associating each of the plurality of strings into data indicative of a respective coordinate in a universal coordinate system.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

DETAILED DESCRIPTION

Figure 1:
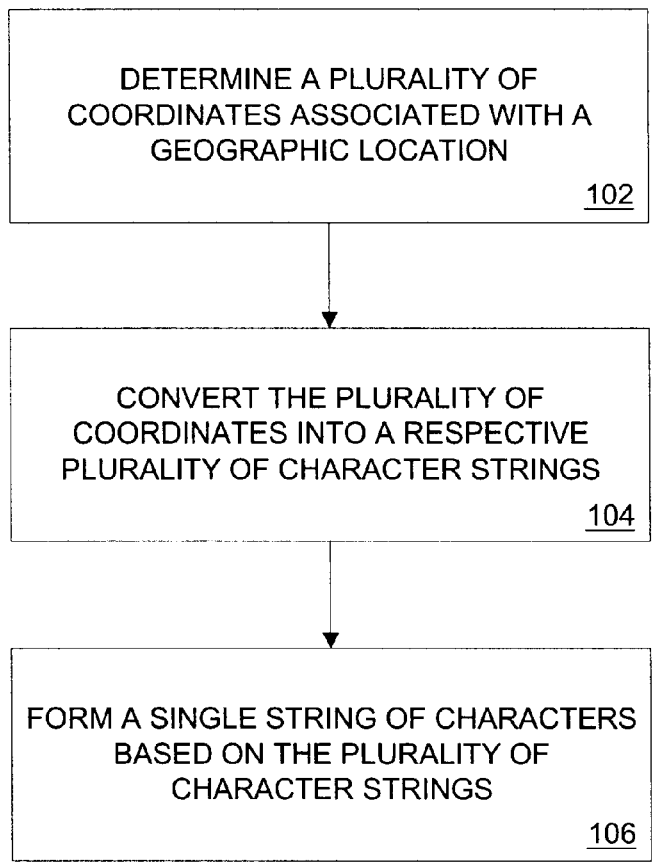
FIG. 1 is a flowchart of a first embodiment of a method in accordance with the present invention.

Embodiments of the present invention provide a system, method, apparatus, means, and computer program code for expressing geographic location or position with a single string of decimal digits or, more generally, a single string of characters. According to embodiments of the present invention, two or more coordinates are expressed as strings or one or more characters which may then be combined to form a single string. One or more digits or other characters in the single string may be indicative of attributes of one or more of the coordinates and/or attributes of the conventions used to create the string. For example, an attribute of a coordinate may be a direction associated with the coordinate, the geographic system (e.g., UTM, WGS84) used to create the coordinate, a geographic zone (e.g. UTM zone) in which the coordinate is meaningful etc. One or more conventions may be used to create the individual strings and/or the final single string of one or more characters. An attribute of such conventions may be the use of concatenation or a particular interspersion rule, as described further on herein, to combine the separate character strings (e.g. each representing one coordinate) into a final single string. Characters used in strings may be numbers, letters, punctuation marks, blank spaces and other symbols, or a combination or two or more of these character types.

Additional objects, advantages, and novel features of the invention shall be set forth in part in the description that follows, and in part will become apparent to those skilled in the art upon examination of the following or may be learned by the practice of the invention.

Applicant has recognized that there is a need for systems, means and methods that allow two or more different coordinates for a geographic location to be expressed as a single string of characters. The single string of characters may include numerical digits or numbers, alphabetic characters or letters, punctuation or other typographical marks including blank spaces when not at the beginning or end of the character string, other symbols, or a combination of two or more of these.

A geographic location may refer to a physical place (e.g., a building, street intersection, national park entrance or trailhead), the location of an object (e.g., a car, the U.S. President, a package), or some other location. In addition, a geographic location may refer to a fixed location, a current, previous or expected location of a moving item or person, or the current, previous or expected location of a movable item or person.

The coordinates for the geographic may be in any format, including one of the many universal coordinate systems such as Universal Transverse Mercator (UTM), Universal Polar Stereographic (UPS), and the World Geodetic System of 1984 (WGS84) latitude and longitude, etc. For example, general latitude or longitude coordinates for Shaw Air Force Base in Sumter, S.C., are thirty-three degrees fifty-four minutes North by eighty degrees twenty-two minutes west, often written as 33° 54' N by 80° 22' W. In some embodiments, two coordinates may be used to express a geographic location without an indication of height or depth while three or more coordinates may be used to express a geographic location including an indication of height or depth. In some embodiments, additional attributes of individual coordinates, groups of coordinates or all coordinates may be used to precisely express a geographic location (e.g. direction east, west, north or south; geographic zone for coordinates). In some embodiments, a coordinate may be used to express or indicate an attribute (e.g., date and time, weather condition, demographic profile) of a location or a person, item, group, etc. at the location.

These and other features will be discussed in further detail below, by describing a system, individual devices, and processes according to embodiments of the invention.

Process Description

Reference is now made to FIG. 1, where a flow chart 100 is shown which represents the operation of a first embodiment of the present invention. The particular arrangement of elements in the flow chart 100 is not meant to imply a fixed order to the steps; embodiments of the present invention can be practiced in any order that is practicable. In some embodiments, some or all of the steps of the method 100 may be performed or completed by a server, user device and/or another device, as will be discussed in more detail below.

In some embodiments, the method 100 may be implemented by a device that determines its own location or a location of another item, device, object, etc. and needs to store or send the information. Alternatively, in some embodiments, the method 100 may be implemented by a device that receives geographic location information and processes it in accordance with the method 100. Other implementations and embodiments are also possible.

Processing begins at a step 102 during which two or more coordinates for a geographic location are determined. For example, coordinate information indicating a latitude and longitude for a geographic location may be determined, such as eighteen degrees, forty-five minutes, thirteen and six-tenths seconds north (18° 45' 13.6" N) and sixty-two degrees, twelve minutes, thirty-eight seconds west (62° 12' 38" W). In some embodiments, information regarding one or more geographic locations may be found or stored in a location information database. Similarly, in some embodiments, information regarding one or more coordinates, coordinate systems, etc. may be found or stored in a coordinate information database. In yet further embodiments, information regarding geographic locations may be received from some measuring device or from some server that provides information obtained from such devices. It is also possible that the coordinates so received could be transformed into new coordinates according to some other universal coordinate system prior to step 104 (e.g. convert coordinates for UTM into coordinates for WGS84).

The step 102 may be completed in a variety of ways. For example, a device (e.g., personal digital assistant, cellular telephone, GPS system) with location determining capabilities itself may determine the geographic location of the device. As another example, a device's (e.g., cellular telephone, two-way pager) location may be determined by other devices and information regarding the location relayed to the device. In a third example, an item's or device's location may be fixed or otherwise known (e.g. by association with some other fixed object or by association with a particular map reference) and information regarding the locations stored in a database, log, file, World Wide Web ("Web") site, or other resource. Other devices may retrieve the location information from the resource or the resource may transmit (e.g., as part of an email message, instant message communication, broadcast, FTP transmission, etc.) or otherwise provide the information to one or more additional devices. In a fourth example, a device may receive the coordinate information from another source for processing, use, etc.

In some embodiments, the step 102 may be or include one or more of the following: receiving a plurality of coordinates via an electronic communication; receiving information regarding a plurality of coordinates from a device; receiving information regarding a first of a plurality of coordinates from a first source and a second of the plurality of coordinates from a second source; retrieving data indicative of a plurality of coordinates; retrieving data indicative of a geographic location, etc.

During a step 104, each of the coordinates determined during the step 102 are converted into a character string. Each character string may include one or more characters and be comprised of numerical digits, alphabetic characters, other symbols, etc. In some embodiments, only a single type of character may be used. For example, in some embodiments, a character string may consist only of numerical decimal digits zero ("0") through nine ("9"). In some embodiments, only characters that can be expressed using a designated minimum and/or maximum number of bits, keystrokes, etc. might be used for the string. In some embodiments, the strings created during the step 104 may include only one type of character (e.g., number, letter) or a mixture of two or more types of characters.

As one example of the step 104, assume that the latitude and longitude coordinates for a geographic location are eighteen degrees, forty-five minutes, thirteen and sixth tenths north (18° 45' 13.6" N) and sixty-two degrees, twelve minutes, thirty-eight seconds west (62° 12' 38" W). For purposes of further explanation 18° 45' 13.6Δ N will be considered one coordinate for the geographic location while 62° 12' 38" W will be considered a second coordinate for the geographic location.

The coordinate 18° 45' 13.6" N can be represented as a string of characters (in this example numerical digits) by expressing the coordinate as "1845136". The example assumes that two digits are used in the string to express degrees, two digits are used in the string to express minutes, and three digits (including a tenths digit) are used in the string to express seconds. If no tenths digits are to be used, the 13.6 seconds can be rounded to 14 and the coordinate expressed as "184514". Similarly, if three digits, none of which represent tenths digits, are to be used for each portion, the coordinate can be expressed as "018045013". Alternatively, the seconds portion of the coordinate could be converted to a decimal fraction of one minute and the ensuing minute portion of the coordinate (including the decimal fraction expressing seconds) could then be converted to a decimal fraction of one degree—yielding the coordinate 18.753778° N (when rounded to 6 significant decimal places) which may then be expressed by the string "18753778". An advantage of representing the minutes and seconds portion of a latitude or longitude coordinate by a decimal fraction of one degree is that the number of digits required to represent a given level of accuracy can be reduced, thereby tending to reduce the length of the final digit or character string.

In some embodiments, a device implementing the step 104 may determine how many degrees of accuracy to use when converting a coordinate into a string. Alternatively, in some embodiments, the device may receive instructions or information regarding the degree of accuracy to use. A convention may be used by a group of devices or entities that identifies or controls the degree of accuracy used to express a coordinate, the number of digits used to express degrees, minutes, seconds, fractions of a second etc. In some embodiments, information regarding one or more conventions may be found or stored in a convention information database.

While the coordinate 18° 45' 13.6" can be expressed in many ways, as illustrated above, depending on the convention used, the direction or heading of north ("N") or south ("S") is not yet indicated. For latitude and longitude, a direction of north, south, east and west may be considered as an attribute of a coordinate. A zone number in UTM also may be considered as an attribute of coordinates expressed using UTM format.

A digit or other character may be used at the beginning, end or middle of the character string to note the direction. For example, the characters "N" and "S" may simply be appended unchanged to the digit strings above to represent north and south. Alternatively to use decimal digits only, a leading zero ("0") may indicate "south" while a leading one ("1") may indicate north. In this case, 18° 45' 13.6" N may be indicated as "11845136", "1184514", "1018045136", "118753778" etc. While these digit stings indicate direction, degrees, then either minutes and seconds or a decimal fraction of a degree, other character string conventions also are possible. For example, the character string might first express seconds, then minutes, then degrees, and then direction.

The coordinate 62° 12' 38" W may be expressed in a manner similar to that described above for the coordinate 18° 45' 13.6" N. For example, 62° 12' 38" W may be expressed as "26212380" where the leading two ("2") indicates a direction of west for the coordinate. A leading character of three ("3") might have been used to indicate a direction of east.

While the example described above has used numerical digits, the coordinates may be converted into character strings using alphabetic characters or other symbols. In addition, a formula or more elaborate rule, procedure, heuristic, process, algorithm, etc. may be used to express each coordinate into a character string. For example, a numerical integer coordinate may be separately divided by each integer in a set of relatively prime integers and the resulting remainders combined (e.g. concatenated) into a new digit string. Alternatively, a coordinate expressed by a more general character string might be transformed using a particular ciphering algorithm and ciphering key. In other universal coordinate systems, particularly those that use zone numbers (e.g., UTM) or other indicators, such indicators can be converted into characters, including decimal numbers, using a process similar to the representation of north, south, east and west described above.

In some embodiments, the step 104 may be or include one or more of the following: determining a degree of accuracy associated with the plurality of strings created during the step 104; identifying a convention for conversion of a coordinate into a string of at least one character; determining a convention for conversion of a coordinate into a string of at least one character and converting each of a plurality of coordinates according to the convention; identifying an attribute for at least one of the coordinates determined during the step 102; identifying an attribute for each of the coordinates determined during the step 102; etc.

During a step 106, the strings created during the step 104 are used to form a single string of characters that express the coordinates determined during the step 102. In a simple example, creating a single character sting may be or include simply appending the strings created during the step 104. For example, the coordinates 18° 45'13.6" N and 62° 12'38" W previously discussed above can be expressed in a single character string as "1184513626212380" where the convention is used that expresses the north/south coordinate first and then the east/west coordinate. This string includes sixteen digits. Other formulas rules, procedures, heuristics, processes, algorithms or other conventions may be used to combine and express each coordinate into a character string.

The leading one "1" and the ninth digit two "2" indicate north and west, respectively, the attributes for the two coordinates. Instead of using two digits to express north and west, a single digit might be used instead. For example, a single character string expressing the coordinates 18° 45' 13.6" N and 62° 12' 38" W may be "218451366212380" where the leading two ("2") represents both north and west and only fifteen digits are used to express the coordinates. For purposes of further discussion, the leading two ("2") will be referred to as an attribute or prefix string. The coordinate information "1845136" and "6212380" described above are still included in the string but only a single digit is used to express both directional attributes. A leading zero "0" might be used to express north and east, a leading one "1" to express south and east, and a leading three "3" to express south and west.

In some embodiments, an attribute string may be used to indicate degrees of accuracy used in character strings expressing coordinates or other information. For example, a first digit in an attribute string may be used to represent direction, as previously discussed above, while a second digit is used to represent degree of accuracy. The coordinates 18° 45' 13.6" N and 62° 12' 38" W may be "20184514621238" where the leading or prefix digit two ("2") indicates north and west and the second digit zero ("0") indicates that seconds are not expressed using digits representing tenths of a second. A second digital one ("1") may indicate that three digits are used to express seconds.

In the previous example the leading digits "20" express two different attributes. In order to lessen the number of digits used (thereby improving convenience), a convention may be adopted that allows more than one attribute to be expressed as a single digit or character. For example, an attribute string may be based on Table 1 provided below.

TABLE 1

| Prefix Digit | Latitude Direction | Longitude Direction | Hundreds Digit for Longitude Coordinate |
|---|---|---|---|
| 0 | North | East | 0 |
| 1 | South | East | 0 |
| 2 | North | West | 0 |
| 3 | South | West | 0 |
| 4 | North | East | 1 |
| 5 | South | East | 1 |
| 6 | North | West | 1 |
| 7 | South | West | 1 |

The hundreds digit for degrees of longitude can only be zero or one since the minimum and maximum degrees of longitude are zero ("0") and 180 respectively. Thus, Table 1 provides for a single prefix digit between and including zero ("0") and seven ("7") to be used to represent both latitude and longitude direction as well as the hundreds digit in the degrees of longitude. According to Table 1, the coordinates 18° 45' 13.6" N and 62° 12' 38" W may be expressed as "218451366212380". The prefix or leading digit two ("2") indicates a north and west direction and the fact that the longitude is less than one hundred degrees. As another example, the coordinates 27° 19' 62.3" S and 148° 34' 19.5" E may be expressed as "527196234834195" wherein the prefix or leading digit five ("5") indicates a south and east direction and that the longitude is at least one hundred degrees.

As another example, in some conventions for expressing a longitude coordinate as a string of characters, the longitude will by default be assumed to have a direction of "east" associated with it and the number of degrees will be allowed to be between zero (0) and 360 degrees. Any longitude coordinate having a direction of "west" associated with it will be subtracted from 360 degrees and be considered to have a direction of "east" associated with it. Therefore, the attribute is absorbed into the string of characters since no separate character is needed to represent direction. Thus, the coordinate 148° 34' 19.5" E can be represented as "14834195" and the coordinate 45° 10' 27.4" W can be represented as "31449326".

In some embodiments, a prefix or attribute string may indicate the geographic coordinate system used for the coordinates determined during the step 102. For example, a leading digit of one ("1") may indicate that UTM is used with the coordinates determined during the step 102 while a leading digit of two ("2") may indicate that WGS84 is used with the coordinates. Alternatively, a leading digit of between "0" and "7" inclusive may be used to indicate both the WGS84 system and the other attributes in Table 1, while a leading digit of "8" could indicate a different coordinate system (e.g. UTM) defined by the second digit of the string.

In some embodiments, an attribute or prefix string may indicate in part the conventions used to obtain the string—i.e. the rules for transforming the individual coordinates into character strings and the rules for combining the separate character strings into a single character string. In other embodiments, these conventions or some of these conventions may be pre-defined and commonly understood from the context in which the geographic location description is being used.

In some embodiments, the step 106 may include interspersing one or more characters from the strings created during the step 104 to create a single or final string. For example, suppose at the completion of the step 104 two strings "ABCDEFGH" and "mnopqrst" are created that represent two coordinates. During the step 106, the strings "ABCDEFGH" and "mnopqrst" may be interspersed during the step 106 according to a designated or predefined convention. For example, the strings may be interspersed to create the string "AmBnCoDpEqFrGsHt". Alternatively, the strings may be interspersed to create the string "ABCmno-DEFpqrGHst". Interspersion of characters from character strings representing more than two coordinates is also possible—e.g. starting with "ABCDE", "ghijk" and "MNOPQ" to create "AgMBhNCiODjPEkQ".

When interspersion is used with strings whose character order from first to last represents the value of each coordinate in strictly increasing order of precision (e.g. "18° 45' 13.6"N" expressed as "11845136"), the resulting interspersed string will also represent the overall geographic location in increasing order of precision. For example, if the coordinates 18° 45' 13.6" N and 62° 12' 38" W are first converted to digit strings "1845136" and "6212380" and the attributes "N", "W" and "no hundreds longitude digit" are combined into the single attribute digit "2" according to Table 1, these three strings may then be interspersed to produce "216824152133860". In this final string, subsequent digits are expressing successfully finer levels of precision in the original coordinates. Digits could then be added to or removed from the end of this final string to increase or reduce, respectively, the overall level of geographic precision. In particular, reducing the number of digits could be viewed as a convenience—at the cost of lower precision—while increasing the number of digits could be viewed as an aid to precision—at the cost of convenience.

In some embodiments, the interspersion convention used during the step 106 may cause some of the characters in the strings created during the step 104 to be dropped or otherwise not used. Thus, the convention may impact the accuracy of the overall conversion of coordinates into a single string expressing the coordinates. In some embodiments, the overall length of the strings created during the step 104 or the single string created during the step 106 may depend on storage requirements or limitations, transmission requirements or limitations, or some other consideration(s).

In some embodiments, more complex means of combining the separate coordinate character strings may be employed.

In some embodiments, a convention used during the step 104 and/or the step 106 may describe or control how the attribute or prefix string is created or used, how an attribute or prefix string may identify a geographic coordinate system being used for the coordinates determined during the step 102, etc.

In some embodiments, additional characters may be added or interspersed into the strings created during the step 104 and/or the string created during the step 106 to encode some property of a overall string and/or provide an ability to check accuracy of a transmission of a string, etc. Methods to derive and use such additional characters using binary related operations can be found in computation and transmission theory (e.g., cyclical redundancy check, parity check, checksum, arithmetic modulus). Attributes of coordinates and properties of the resulting character string may also be represented by operations performed on all or part of the string, which result in a new string containing more characters and/or more possible character permutations. For example, a string consisting solely of decimal digits could be treated as a decimal integer and multiplied by some other pre-defined integer greater than one. The resulting new string expressing a now larger number could be reconverted back into the original string by dividing by the same integer. If the result is not an exact integer, the entity performing the division will know that some corruption of the digit string must have occurred. Using more general conventions (e.g. employing algorithms used in ciphering), rules would be established for transforming the character string originally obtained from the location coordinates, coordinate attributes and conventions used to obtain the character string into a longer and/or more variable character string on a one to one basis. The one-to-one transformation rules would always allow the original character string to be re-obtained in principle from the longer more variable character string—though the complexity of this reverse transformation might not always be simple. Since the strings obtained by such one to one transformations include more permutations (i.e. there are more possible strings in the transformed set than in the original set), errors in storage, recall and transmission of the transformed strings will be possible to verify with high reliability, because a transformed string containing errors will not normally be transformable back into an original string. As a simple example, consider the transformation whereby some original digit string, e.g. "1234", is multiple by the integer 17 to yield a final (longer) digit string, in this case "20978". Now suppose that one of the digits in the new string is accidentally corrupted and that an erroneous string of "21978" is provided for re-conversion into the original string. Dividing this number by 17 yields 1292 remainder 14, which implies the presence of an error because the result is not an exact integer. In this case, adding more variability to the final digit string (by increasing the number of digits) has provided a measure of error protection. In a more complex example, an original digit string, treated as an integer, might be divided by each of a sequence of relatively prime numbers with the remainders concatenated or interspersed to yield a new digit string. By using a larger set of relatively prime numbers than strictly needed to restore the original digit string from the remainders, redundancy can be built in to detect subsequent errors.

In some embodiments, the method 100 may include determining a transformation that converts one string into another string and encodes error protection into the second single string. In addition, in some embodiments, the method 100 may include converting the first string into the second single string in accordance with the transformation. The second string may be longer than the first string, include more characters than the first string, etc.

In some embodiments, the step 106 may be or include one or more of the following: identifying a convention for conversion of the strings created during the step 104 into the single string; determining a convention for conversion of the strings created during the step 104 into a single string forming the single string according to the convention; interspersing the strings created during the step 104 into a single string; identifying or otherwise determining a convention to interperse the strings created during the step 104; etc.

In some embodiments, the string created during the step 106 may include only one type of character (e.g., number, letter) or a mixture of two or more types of characters. The string created during the step 106 also may use one or more types of characters that were or were not used in the strings created during the step 104. As an example, if the coordinate and attribute strings were combined, possibly with error protection, into a single string composing decimal digits only, a further conversion could be performed into a larger character set to reduce the length of the final string. As a particular example of this, provided the decimal digit string did not begin with a leading zero ("0"), it could first be uniquely converted into a binary number consisting only of ones ("1") and zeroes ("0"). These binary digits could then be grouped into consecutive runs of five digits going from right to left (least significant to most significant) with the final (most significant) run of binary digits being padded out with additional zeroes if necessary to achieve an exact run of five. Each run could then be assigned a particular alphabetic letter or decimal digit by associating each one of the 32 possible permutations of five ones and zeroes with a unique alphabetic letter or decimal digit. Since there are 36 alphabetic letters and decimal digits, the four digits and letters that might most easily be confused could be omitted (e.g. omit the letters "I", "L", "O", "Q" but include the decimal digits "1" and "0"). The resulting alphanumeric character string will then be approximately ⅔ of the length of the original decimal digit string—providing possible convenience for some applications. Other transformations of a character string into a longer character string using characters from a smaller character set are also possible for other reasons of convenience (e.g. where some characters in the larger set cannot be recorded or transmitted easily or reliably).

In some embodiments, the method 100 may include storing or transmitting some or all of the strings created during the step 104 and/or some or all of the string created during the step 106. Some or all of the strings created during the step 104 or the string created during the step 106 may be transmitted as part of a radio signal transmission, email message, instant message communication, FTP (file transfer protocol) or HTML (hypertext markup language) transmission, XML (extensible markup language) feed, telephone or facsimile signal, wireless transmission, or other electronic communication. In addition, such strings may be stored, recalled and transmitted by non-electronic means such as on paper, plastic card, verbally.

In some embodiments, the method 100 may include converting or otherwise transforming the string created during the step 106 into a new string that uses or includes one or more different characters. For example, if the string created during the step 106 uses only numerical digits, that string may be converted at a later time into a string that uses only alphabetic characters.

Figure 2:
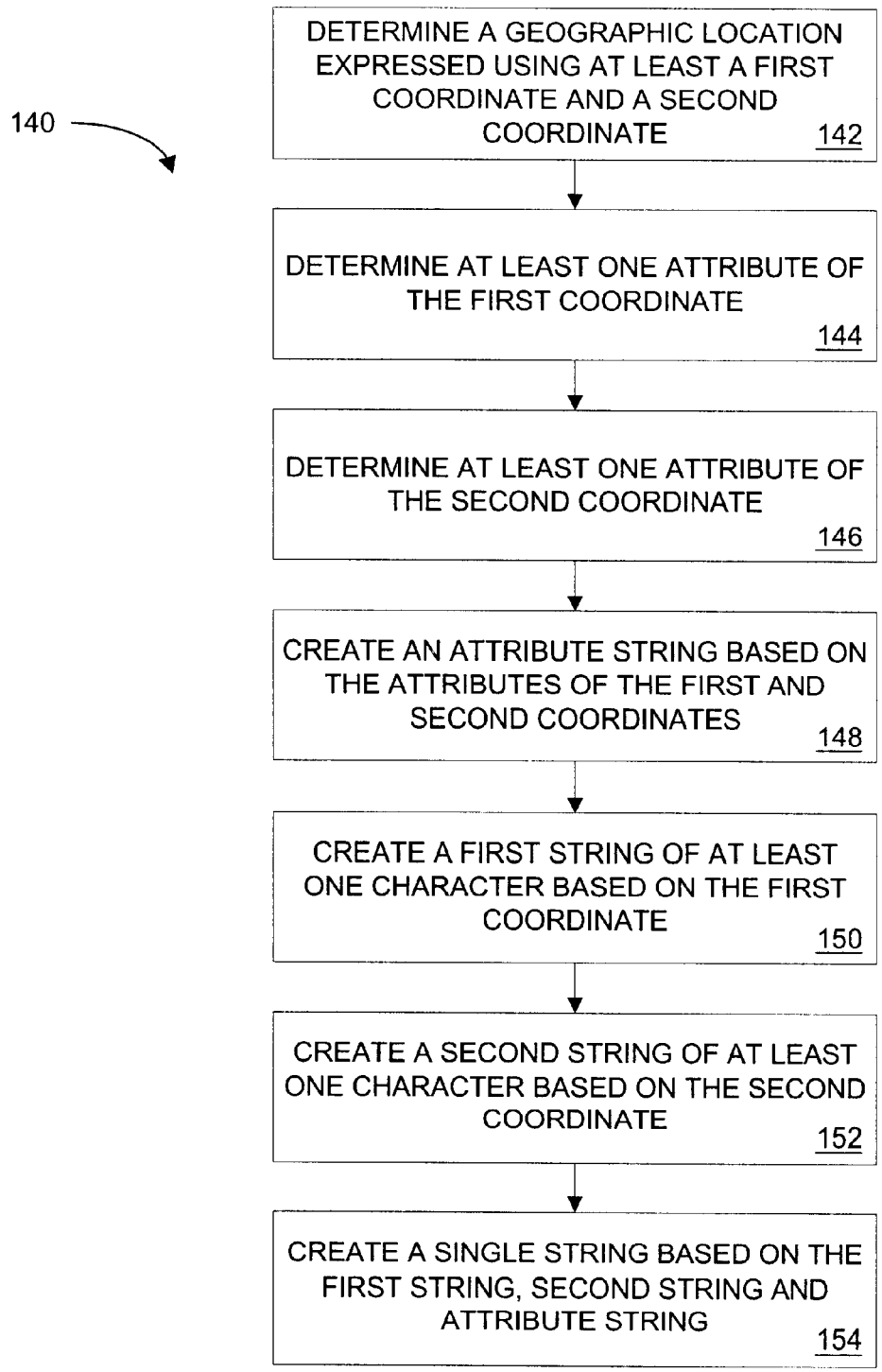
FIG. 2 is a flowchart of a second embodiment of a method in accordance with the present invention.

Reference is now made to FIG. 2, where a flow chart 140 is shown which represents the operation of a second embodiment of the present invention. The particular arrangement of elements in the flow chart 140 is not meant to imply a fixed order to the steps; embodiments of the present invention can be practiced in any order that is practicable. In some embodiments, some or all of the steps of the method 140 may be performed or completed by a server, user device and/or another device, as will be discussed in more detail below. In some embodiments, the method 140 may include some or all of the variations discussed above in reference to the method 100.

Processing begins at a step 142 during which a geographic location is identified or otherwise determined that is expressed using at least two coordinates. For purposes of further explanation, but not limitation, the method 140 will assume that two coordinates (i.e., a first coordinate and a second coordinate) are determined during the step 142. The step 142 is similar to the step 102 previously discussed above. The coordinates identified during the step 142 may be in a universal coordinate system (e.g., UTM, UPS, WGS84), a national coordinate system (e.g. British National Grid, US State Plan system), regional coordinate system, or in a use specific format.

During a step 144, an attribute of the first coordinate is determined and during a step 146 an attribute of second coordinate is determined. As previously discussed above, an attribute may be or include direction, coordinate system used to express the first coordinate, degree or number of digits of accuracy in the first coordinate, etc. In some embodiments, the step 144 and 146 may be combined into a single step.

In some embodiments, determining an attribute of a coordinate may be or include one or more of the following: determining a direction associated with the coordinate; determining a degree of accuracy associated with the coordinate; determining an identifier associated with a source of a geographic location; determining a coordinate system used to express the coordinate; determining an identifier associated with a source or time of information regarding the coordinate; etc.

During a step 148, an attribute string is created based on all or some of the attributes determined during the steps 144 and 146. The attribute string may use one or more characters to express the attributes determined during the steps 144 and 146 as previously illustrated above. The step 148 may be implemented in accordance with a known or predefined convention. The attribute string may include information regarding the coordinate system used to express the first and second coordinates, directions or zones associated with the first and second coordinates, etc. The attribute string may further include information regarding the conventions used in each of the steps of this process. Since the attribute string may then include information on the conventions used to create itself, there will always need to be at least some pre-defined commonly known conventions that are not part of the attribute string or final character string. Such commonly known conventions would be used to begin the process of converting a geographic character string back into its component attributes and coordinates. The attribute string may be one or more characters, include one or more types of characters, etc.

In some embodiments, the step 148 may be or include one or more of the following: including at least one character in the attribute string that is indicative of the attribute of the first coordinate determined during the step 144; including at least one character in the attribute string that is indicative of the attribute of the second coordinate determined during the step 146; including at least one character in the attribute string that is simultaneously indicative of the attribute of the first coordinate determined during the step 144 and the attribute of the second coordinate determined during the step 146; etc.

During a step 150, a string of at least one character is created based on just the first coordinate or based on the first coordinate and one or more of its attributes (e.g. direction of a longitude or latitude coordinate). Thus, the first coordinate and possibly some of its attributes is/are converted into a string of at least one character. Similarly, during a step 152, a string of at least one character is created based on just the second coordinate or based on the second coordinate and one or more of its attributes. The steps 150 and 152 are similar to the steps 104 previously discussed above. In some embodiments, the steps 150 and 152 may be combined into a single step. In addition, in some embodiments, the step 150 and/or the step 152 may occur prior to the steps 144, 146 and/or the step 148.

The strings created during the steps 150 and 152 may include a single type (e.g., symbol, letter, number) of character or multiple types of characters. In some embodiments, converting a coordinate and possibly its attributes into a string of at least one character may be or include identifying a convention to be used for the conversion as well as use of a known or pre-designated convention; etc.

During a step 154, a single string of at least one character is created based, at least in part, on the strings created during the steps 148, 150 and 152. The string created during the step 154 may include a single type (e.g., symbol, letter, number) of character or multiple types of characters. In some embodiments, creating the single string during the step 154 may include identifying a convention to be used for creating the string; converting the three strings into a single string in accordance with a known or designated convention; interspersing one or more of the characters from the strings created during the steps 148, 150 and 152; etc. As in the steps 104 and 106, an additional transformation of the resulting character string may be performed (e.g. CRC check, multiplication by a fixed integer) to support error protection. More specifically, in some embodiments, the method 140 may include determining a transformation that converts one string into another string and encodes error protection into the second string. In addition, in some embodiments, the method 140 may include converting the first string into the second string in accordance with the transformation. The second string may be longer than the first string, include characters from a larger character set than the first string, etc.

In some embodiments, the method 140 may include storing or transmitting some orall of the strings created during the steps 148, 150, 152 and/or some or all of the string created during the step 154. In some embodiments, the method 140 may include converting or otherwise transforming the string created during the step 154 into a new string that uses or includes one or more different characters.

Figure 3:
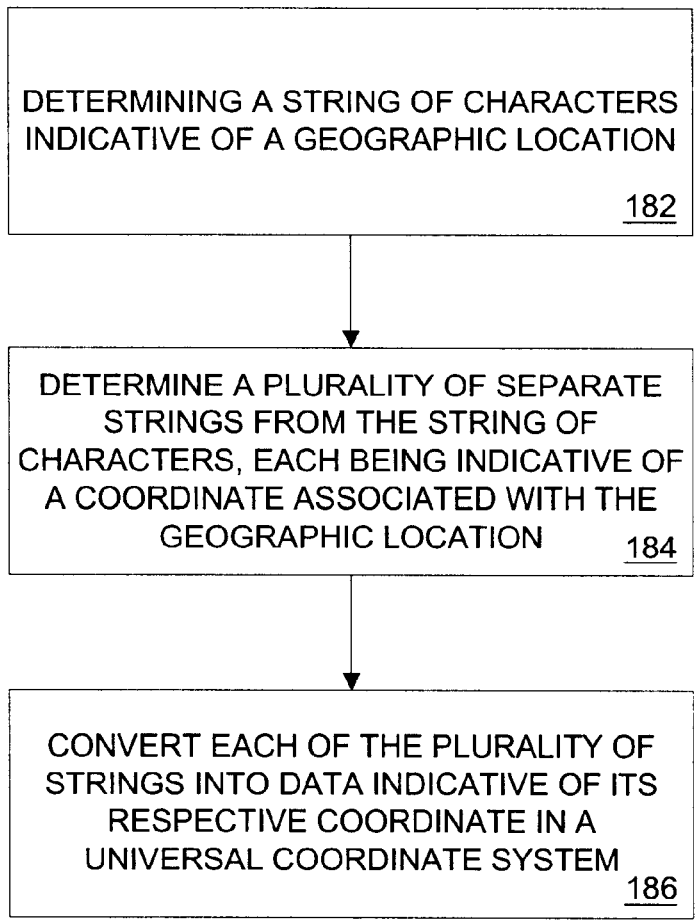
FIG. 3 is a flowchart of a third embodiment of a method in accordance with the present invention.

Reference is now made to FIG. 3, where a flow chart 180 is shown which represents the operation of a third embodiment of the present invention. The particular arrangement of elements in the flow chart 180 is not meant to imply a fixed order to the steps; embodiments of the present invention can be practiced in any order that is practicable. In some embodiments, some or all of the steps of the method 180 may be performed or completed by a server, user device and/or another device, as will be discussed in more detail below. The method 180 particularly is useful for a device or entity receiving a string of digits or, more generally, characters expressing one or more coordinates for a geographic location.

Processing begins at a step 182 during which a string of at least one character indicative of a geographic location is received or otherwise determined. In some embodiments, the string received during the step 182 may be or include characters indicative or one or more coordinates that express or identify the geographic location.

The string of at least one character may be received as part of an electronic signal or other communication; retrieved or received from a device; retrieved from a database, Web site, or other resource; generated by software operating on a device; received from one or more sources; etc. The string may also be received by non-electronic means—e.g. written on paper, embossed on a plastic card, conveyed verbally. The string may include or be comprised of one or more types of characters.

In some embodiments, after the step 182, an optional step may be included in the method 180 or implemented during which operations may be performed for error checking and extraction of one or more conventions used to build the string received during the step 182. During this optional step, error checking may be performed on the string, including any transformation needed for this (e.g. division by a known fixed integer), and one or more conventions used to create the string received during the step 182 may be extracted if not already known. As already mentioned above, at least some conventions may be pre-defined and known in advance. The result of performing this optional step may be a shorter or simpler character string in which any error protection transformation has been removed.

During a step 184, a plurality of separate strings is determined or created from the string determined during either the step 182 or the optional step performed after the step 182 discussed above. The step 184 is complementary to the step 106 previously discussed above. In some embodiments, the step 184 may include determining, or receiving or retrieving, information regarding an interspersion rule or other convention used to create the string determined during the step 182 or the optional step following step 182. In some embodiments, the method 180 may include storing or transmitting one or more of the strings determined during the step 184.

The strings created during the step 184 may include an attribute string (for any attributes not deduced during the optional step discussed above), one or more prefix digits, and/or one or more strings that express just individual coordinates or individual coordinates and some of their attributes. The attribute string or prefix digit(s) as well as any attributes determined from the optional step discussed above may be indicative of direction, zone, coordinate system, string encoding convention, interspersion convention, degree of accuracy, etc. associated with one or more of the individual coordinates that are expressed in other strings created during the step 184.

During a step 186, some or all of the strings determined during the step 184 are converted into coordinates indicative of a geographic location. The step 186 is complementary to the step 104 previously discussed above.

In some embodiments, the step 186 may include determining, or receiving or retrieving, information regarding a convention used to create the strings determined during the step 184. In some embodiments, the method 180 may include storing or transmitting one or more of the coordinates determined during the step 186.

Device

Figure 4:
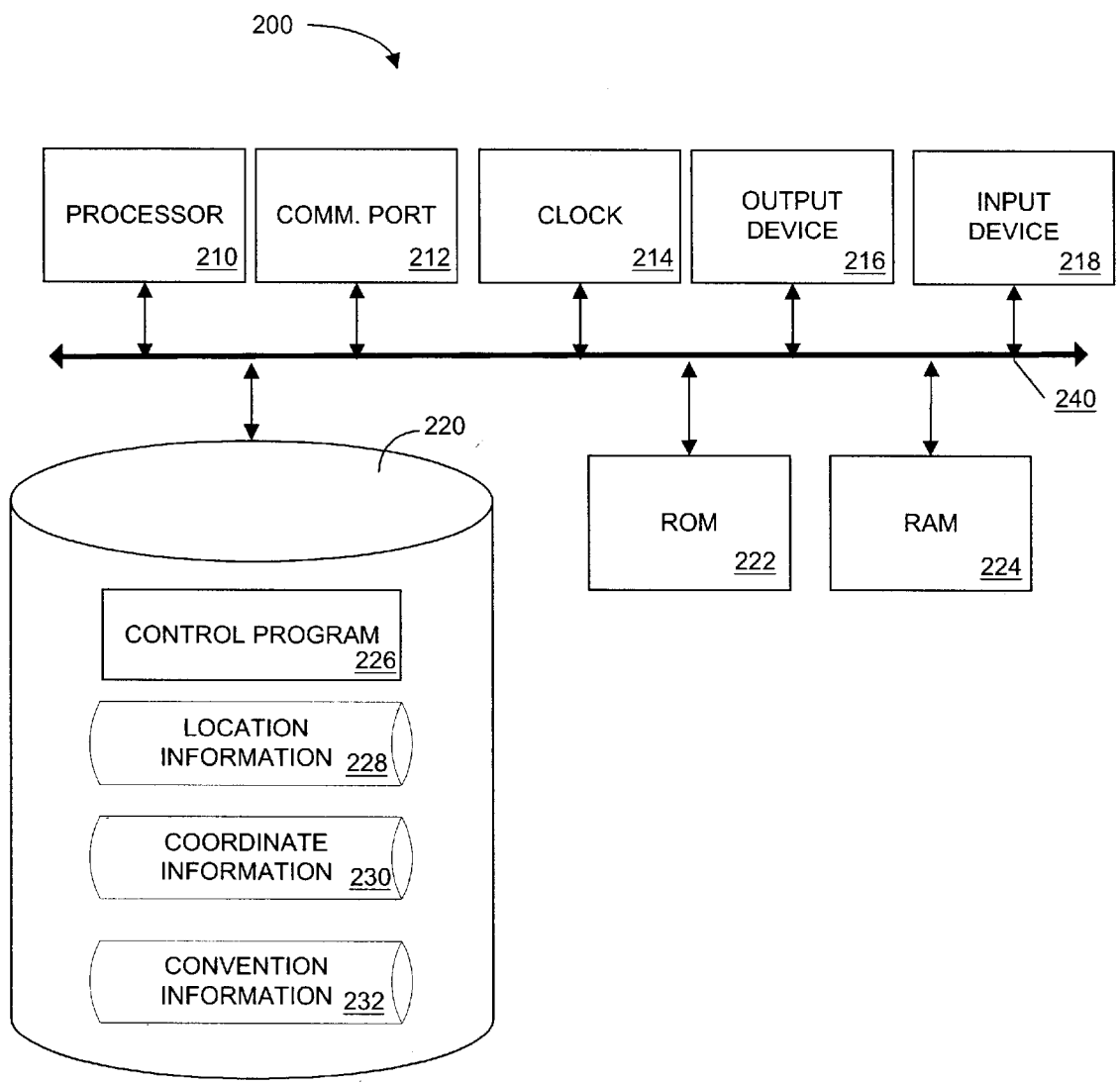
FIG. 4 is a block diagram of system components for an embodiment of an apparatus usable with the methods of FIGS. 1–3.

Now referring to FIG. 4, a representative block diagram of a user device, server, computer, etc. 200 is illustrated. The device 200 may be or include any of a number of different types of devices, including, but not limited to a personal computer, portable computer, mobile or fixed user station, workstation, network terminal or server, telephone, cellular telephone, GPS device, beeper, kiosk, dumb terminal, personal digital assistant, facsimile machine, two-way pager, radio, cable set-top box, etc.

The device 200 may include a processor, microchip, central processing unit, or computer 210 that is in communication with or otherwise uses or includes one or more communication ports 212 for communicating with user devices and/or other devices. Communication ports may include such things as local area network adapters, wireless communication devices, antennas, Bluetooth technology, etc. The device 200 also may include an internal clock element 214 to maintain an accurate time and date for the device 200, create time stamps for communications received or sent by the device 200, etc.

If desired, the device 200 may include one or more output devices 216 such as a printer, infrared or other transmitter, antenna, audio speaker, display screen or monitor, text-to-speech converter, etc., as well as one or more input devices 218 such as a bar code reader or other optical scanner, infrared or other receiver, antenna, magnetic stripe reader, image scanner, roller ball, touch pad, joystick, touch screen, microphone, computer keyboard, computer mouse, etc.

In addition to the above, the device 200 may include a memory or data storage device 220 to store information, software, databases, communications, device drivers, coordinates, strings, conventions, geographic locations, coordinate systems, etc. The memory or data storage device 220 preferably comprises an appropriate combination of magnetic, optical and/or semiconductor memory, and may include, for example, Random Read-Only Memory (ROM), Random Access Memory (RAM), a tape drive, flash memory, a floppy disk drive, a Zip™ disk drive, a compact disc and/or a hard disk. The device 200 also may include separate ROM 222 and RAM 224.

The processor 210 and the data storage device 220 in the device 200 each may be, for example: (i) located entirely within a single computer or other computing device; or (ii) connected to each other by a remote communication medium, such as a serial port cable, telephone line or radio frequency transceiver. In one embodiment, the device 200 may comprise one or more computers that are connected to a remote server computer for maintaining databases.

A conventional personal computer or workstation with sufficient memory and processing capability may be used as the device 200. In one embodiment, the device 200 operates as or includes a Web server for an Internet environment. The device 200 preferably is capable of high volume transaction processing, performing a significant number of mathematical calculations in processing communications and database searches. A Pentium™ microprocessor such as the Pentium IV™ microprocessor, manufactured by Intel Corporation may be used for the processor 210. Equivalent or other processors are available from Motorola, Inc., AMD, or Sun Microsystems, Inc. The processor 210 also may comprise one or more microprocessors, computers, computer systems, etc.

Software may be resident and operating or operational on the device 200. The software may be stored on the data storage device 210 and may include a control program 226 for operating the server, databases, coordinate conversions, string storage or transmission, information retrieval, etc. The control program 226 may control the processor 210. The processor 210 preferably performs instructions of the control program 226, and thereby operates in accordance with the present invention, and particularly in accordance with the methods described in detail herein. The control program 226 may be stored in a compressed, uncompiled and/or encrypted format. The control program 226 furthermore includes program elements that may be necessary, such as an operating system, a database management system and device drivers for allowing the processor 210 to interface with peripheral devices, databases, etc. Appropriate program elements are known to those skilled in the art, and need not be described in detail herein.

The device 200 also may include or store information regarding users, geographic locations, coordinates, coordinate systems, strings, communications, etc. For example, information regarding one or more geographic locations may be stored in a location information database 228 for use by the device 200 or another device or entity. Information regarding one or more coordinates may be stored in a coordinate information database 230 for use by the device 200 or another device or entity and information regarding one or more conventions may be stored in a convention information database 232 for use by the device 200 or another device or entity. In some embodiments, some or all of one or more of the databases may be combined or stored or mirrored remotely from the device 200.

According to an embodiment of the present invention, the instructions of the control program may be read into a main memory from another computer-readable medium, such as from the ROM 222 to the RAM 224. Execution of sequences of the instructions in the control program causes the processor 210 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

The processor 210, communication port 212, clock 214, output device 216, input device 218, data storage device 220, ROM 222, and RAM 224 may communicate or be connected directly or indirectly in a variety of ways. For example, the processor 210, communication port 212, clock 214, output device 216, input device 218, data storage device 220, ROM 222, and RAM 224 may be connected via a bus 240.

While a specific implementation and hardware configuration for the device 200 has been illustrated, it should be noted that other implementations and hardware configurations are possible and that no specific implementation or hardware configuration is needed. Thus, not all of the components illustrated in FIG. 4 may be needed for a device implementing the methods disclosed herein. Therefore, many different types of implementations or hardware/software configurations can be used in the device 200 and the methods disclosed herein are not limited to any specific hardware configuration.

The methods of the present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein could be implemented in many different ways using a wide range of programming techniques as well as general-purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

Although the present invention has been described with respect to various embodiments thereof, those skilled in the art will note that various substitutions may be made to those embodiments described herein without departing from the spirit and scope of the present invention.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed:

1. A method for expressing a geographic location in a coordinate system, comprising:
    determining a plurality of coordinates in a coordinate system associated with a geographic location, each of said plurality of coordinates having at least one associated attribute discernable from the respective coordinate;
    converting said plurality of coordinates into a respective plurality of strings of at least one character; and
    forming a single string of characters having a first portion and a second portion based on said plurality of strings of at least one character and at least one attribute associated with one of said plurality of coordinates, said first portion including at least one character indicative of said at least one attribute, and said second portion including at least one character indicative of said plurality of strings of at least one character,
    said single string being indicative of said plurality of coordinates in said coordinate system.

2. The method of claim 1, wherein said determining a plurality of coordinates associated with a geographic location includes at least one of the following:
    receiving said plurality of coordinates via an electronic communication;
    receiving information regarding said plurality of coordinates from a device;
    receiving information regarding a first of said plurality of coordinates from a first source and a second of said plurality of coordinates from a second source;
    retrieving data indicative of said plurality of coordinates; and
    retrieving data indicative of said geographic location.

3. The method of claim 1, wherein said converting said plurality of coordinates into a respective plurality of strings of at least one character includes at least one of the following:
    determining a degree of accuracy associated with said plurality of strings;
    identifying a convention for conversion of a coordinate into a string of at least one character;
    determining a convention for conversion of a coordinate into a string of at least one character and converting each of said plurality of coordinates according to said convention;
    identifying an attribute for at least one of said plurality of coordinates;
    identifying an attribute for each of said plurality of coordinates;
    encoding at least one attribute into at least one of said plurality of strings;
    encoding an identifier of at least one degree of accuracy into at least one of said plurality of strings; and
    encoding an identifier of at least one convention into at least one of said plurality of strings.

4. The method of claim 1, wherein said forming a single string of characters based on said plurality of strings of at least one character includes at least one of the following:
    identifying a convention for conversion of said plurality of strings into said single string;
    encoding at least one attribute into said single string;
    encoding at least one convention into said single string; and
    determining a convention for conversion of said plurality of strings into said single string and forming said single string according to said convention.

5. The method of claim 1, wherein said forming a single string of characters based on said plurality of strings of at least one character includes at least one of the following:
    interspersing said plurality of strings of at least one character to create said single string; and
    concatenating said plurality of strings of at least one character to create said single string.

6. The method of claim 1, further comprising:
    determining a convention to intersperse said plurality of strings.

7. The method of claim 1, wherein said geographic location is expressed in a universal coordinate system.

8. The method of claim 1, further comprising:
    identifying an attribute of at least one of said plurality of coordinates; and
    forming at least one attribute string indicative of a first attribute and a second attribute different from said first attribute.

9. A method for expressing a geographic location, comprising:
    determining a geographic location expressed using at least a first coordinate and a second coordinate;
    determining at least one attribute of said first coordinate, said at least one attribute being discernable from said first coordinate;
    determining at least one attribute of said second coordinate, said at least one attribute being discernable from said second coordinate;

determining an attribute string based, at least in part, on said at least one attribute of said first coordinate and said at least one attribute of said second coordinate;

creating a first string of at least one character representative of said first coordinate;

creating a second string of at least one character representative of said second coordinate; and creating a single string of at least one character based, at least in part, on said first string, said second string, and said attribute string.

10. The method of claim 9, further comprising:

determining at least one convention associated with said attribute string.

11. The method of claim 9, further comprising:

determining at least one convention associated with said first string.

12. The method of claim 9, wherein said creating a first string of at least one character representative of said first coordinate includes creating a first string of at least one character representative of said first coordinate and at least one attribute of said first coordinate.

13. The method of claim 9, wherein said determining at least one attribute of said first coordinate includes at least one of the following:

determining a coordinate system used to express said first coordinate;

determining a direction associated with said first coordinate;

determining a degree of accuracy associated with said first coordinate;

determining an identifier associated with a source of said geographic location; and determining an identifier associated with a source of said first coordinate.

14. The method of claim 9, wherein said determining an attribute string based, at least in part, on said at least one attribute of said first coordinate and said at least one attribute of said second coordinate includes:

including at least one character in said attribute string that is indicative of said at least one attribute of said first coordinate and said at least one attribute of said second coordinate.

15. The method of claim 9, wherein said creating a first string of at least one character representative of said first coordinate includes identifying a convention for conversion of a coordinate into a string of at least one character and converting said first coordinate into said first string in accordance with said convention.

16. The method of claim 9, wherein said creating a single string of at least one character based, at least in part, on said first string, said second string, and said attribute string includes identifying a convention for conversion of said first string, said second string and said attribute string into a single string of at least one character and converting said first string, said second string, and said attribute string into said single string in accordance with said convention.

17. The method of claim 9, further comprising:

determining a transformation that converts said single string into a second single string and encodes error protection into said second single string.

18. A method for determining a geographic location, comprising:

determining a string of characters indicative of a geographic location in a coordinate system, said string of characters having a first portion and a second portion, and said first portion includes at least one character indicative of at least one attribute of at least one coordinate, and said second portion includes at least one character indicative of at least one of a plurality of strings of at least one character;

determining a plurality of strings from said string of characters, each of said plurality of strings being indicative of a coordinate associated with said geographic location; and converting each of said plurality of strings into data indicative of its respective coordinate in a universal coordinate system.

19. The method of claim 18, further comprising:

determining an attribute associated with at least one of said plurality of strings based, at least in part, on said string of characters.

20. The method of claim 18, wherein said determining a string of characters indicative of a geographic location includes at least one of the following:

receiving said string of characters from a single source;

receiving an electronic communication that includes said string of characters;

retrieving information that includes said string of characters; and extracting at least one convention from said string of characters.

21. The method of claim 18, wherein said determining a plurality of strings from said string of characters includes determining a plurality of strings from said string of characters, each of said plurality of strings being indicative of a coordinate associated with said geographic location, a coordinate associated with said geographic location and at least one of its attributes, or at least one attribute of all coordinates.

22. The method of claim 18, wherein said converting each of said plurality of strings into data indicative of its respective coordinate in a universal coordinate system includes converting each of said plurality of strings that represent coordinates into data indicative of its respective coordinate in a universal coordinate system.

23. A system for creating a string expressing a geographic location, comprising:

a memory;

a communication port; and a processor connected to said memory and said communication port, said processor being operative to:

determine a geographic location expressed using at least a first coordinate and a second coordinate;

determine at least one attribute of said first coordinate, said at least one attribute being discernable from said first coordinate;

determine at least one attribute of said second coordinate, said at least one attribute being discernable from said second coordinate;

determine an attribute string based, at least in part, on said at least one attribute of said first coordinate and said at least one attribute of said second coordinate;

create a first string of at least one character representative of said first coordinate;

create a second string of at least one character representative of said second coordinate; and create a single string of at least one character based, at least in part, on said first string, said second string, and said attribute string.

24. A computer program product in a computer readable medium for creating a string expressing a geographic location, comprising:
 first instructions for identifying a geographic location expressed using at least a first coordinate and a second coordinate;
 second instructions for identifying at least one attribute of said first coordinate, said at least one attribute being discernable from said first coordinate;
 third instructions for identifying at least one attribute of said second coordinate, said at least one attribute being discernable from said second coordinate;
 fourth instructions for identifying an attribute string based, at least in part, on said at least one attribute of said first coordinate and said at least one attribute of said second coordinate;
 fifth instructions for generating a first string of at least one character representative of said first coordinate;
 sixth instructions for generating a second string of at least one character representative of said second coordinate; and
 seventh instructions for generating a single string of at least one character based, at least in part, on said first string, said second string, and said attribute string.

25. The computer program product of claim 24, wherein said fifth instructions include instructions for generating a first string of at least one character representative of said first coordinate and at least one attribute of said first coordinate.

* * * * *